Aug. 5, 1924.
W. LUTES
1,504,066
AUTOMATIC AIR PRESSURE GAUGE
Filed Aug. 25, 1922
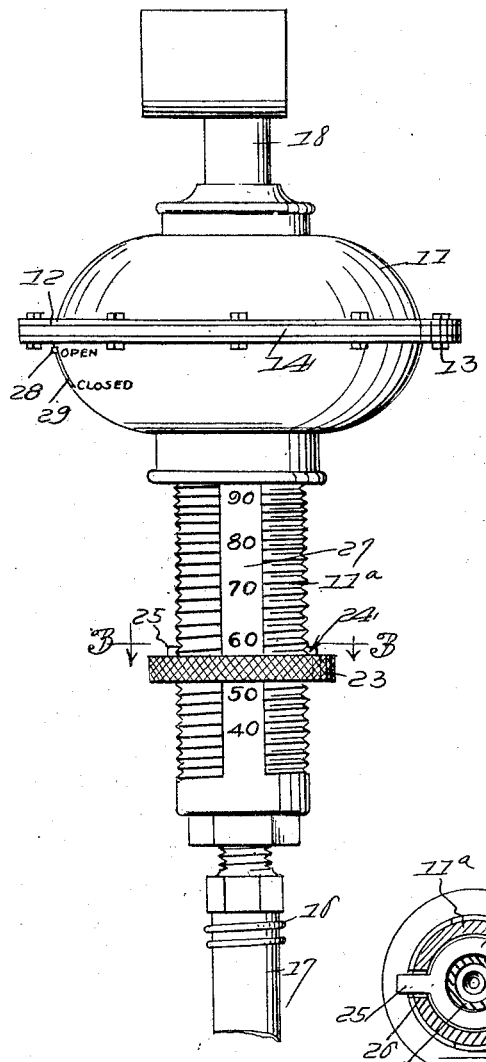
Fig. 1.
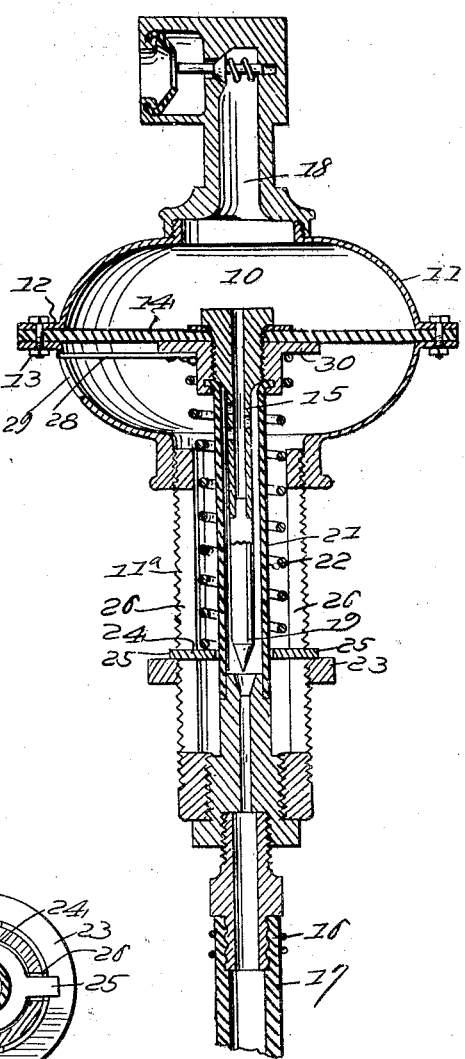
Fig. 2.
Fig. 3.
Inventor
William Lutes,
By
Attorney Patented Aug. 5, 1924.

1,504,066

UNITED STATES PATENT OFFICE.

WILLIAM LUTES, OF SAN ANTONIO, TEXAS.

AUTOMATIC AIR-PRESSURE GAUGE.

Application filed August 25, 1922. Serial No. 584,369.

*To all whom it may concern:*

Be it known that WILLIAM LUTES, a citizen of the United States of America, residing at San Antonio, in the county of Bexar and State of Texas, has invented new and useful Improvements in Automatic Air-Pressure Gauges, of which the following is a specification.

The object of the invention is to provide an automatic air pressure gauge and cut-off for use in tire inflating apparatus as a means of accurately determining the pressure applied in the inflation of the tire and checking the inflation thereof when the predetermined desirable pressure has been attained to avoid over-inflating; and with this object in view the invention consists in a construction and combination of parts of which a preferred embodiment is shown in the accompanying drawings, wherein:—

Figure 1 is a side view, and

Figure 2 is a sectional view of a pressure gauge constructed in accordance with the invention.

Figure 3 is a sectional view on the line 3—3 of Figure 1.

The apparatus embodies a pressure chamber 10 forming a compartment of a casing 11 consisting of separable members flanged as indicated at 12 and connected by bolts 13, one wall of the pressure chamber being formed by a diaphragm 14 of which the peripheral edge is clamped between the flanges 12; and an air inlet tube 15 being in communication with the pressure chamber and being provided with a coupling 16 for attachment to a hose or pressure line 17 leading from a suitable source of pressure such as a pump or its equivalent (not shown). The pressure chamber is also provided with an outlet 18 constructed in the form of a chuck for engagement with the valve tube of an automobile tire for conveying air to the inflatable inner tube thereof.

The diaphragm carries a cut-off valve 19 of the needle valve type for which there is provided a seat 20 whereby when the pressure in the pressure chamber exceeds a predetermined amount and deflects the diaphragm, the valve will be seated to cut off the supply of pressure.

The supply tube is provided within the casing with a flexible section 21 so that the rigid sections thereof, carried respectively by the casing and the diaphragm may be relatively movable in effecting the seating of the valve without interrupting the supply of pressure, and in connection with the diaphragm there is used a pressure resisting spring 22 serving to yieldingly hold the diaphragm in its normal position and tensionable by means of a nut 23 which is threaded exteriorly upon the tubular portion 11$^a$ of the casing to afford a greater or less resistance to the air pressure so that a greater or less pressure may be applied to the tire tube to suit the requirements of the service for which it is intended. The lower end of the spring bears upon a follower 24 having arms 25 constituting indicators which extend through slots 26 in the side wall of the casing and traverse a scale 27 graduated to indicate pounds of pressure. Therefore by adjusting the tensioning nut to cause the pointer to register with a given graduation of the scale a predetermined pressure may be applied to the tire tube and when such pressure has been reached, owing to the fact that the diaphragm is exposed at one side to the same pressure as the interior of the tire tube, the resistance offered by the tension spring will be overcome and the valve will be seated to cut off the supply of pressure.

In order that the operator may be advised of the completion of the operation of charging the tire tube to the required pressure to which the apparatus has been set by the adjustment of the nut 23 there is employed an indicator consisting of a pointer 28 carried by and movable with the diaphragm and the cut-off valve, which projects through a slot 29 in the side of the casing 11 to traverse a scale marked "Open" and "Closed", and serving to show upon exterior inspection whether or not the cut-off valve is in its open or its closed position.

Having described the invention, what is claimed as new and useful is:—

1. A pressure gauge for tire inflating apparatus having a casing provided with a pressure chamber, a pressure tube in communication with the pressure chamber and having a valve chuck for engagement with the valve of a tire to be inflated, a diaphragm forming one wall of and exposed to pressure within the pressure chamber, a cut-off valve carried by and actuable by said diaphragm, the casing having an air inlet and a valve seat for engagement with said cut-off valve, and a flexible tubular connection housed within the casing and enclosing said cut-off valve and constituting a means of communication between said valve seat and the pressure chamber when the cut-off valve is open.

2. A pressure gauge for tire inflation apparatus having a casing provided with a pressure chamber, a pressure supply tube having a valve chuck for engagement with the valve of the tire to be inflated, a diaphragm forming one wall of and exposed to pressure within the pressure chamber, a cut-off valve actuable by the diaphragm, the casing having a supply tube provided with a seat with which the cut-off valve is engageable, and a pointer rigidly mounted with respect to the diaphragm and protruding through a slot in the casing for traversing an indicator exposed thereon.

In testimony whereof he affixes his signature.

WILLIAM LUTES.